United States Patent [19]

Warnant et al.

[11] 3,919,198

[45] Nov. 11, 1975

[54] DIENIC DERIVATIVES OF THE ANDROSTANE SERIES AND PROCESS

[75] Inventors: Julien Warnant, Neuilly-sur-Seine; Jean Jolly, Fontenay-sous-Bois, both of France

[73] Assignee: Roussel-UCLAF, Paris, France

[22] Filed: Feb. 1, 1974

[21] Appl. No.: 438,602

[30] Foreign Application Priority Data

Feb. 6, 1973 France............................ 73.04058

[52] U.S. Cl. ..... 260/239.55; 260/239.57; 260/397.1
[51] Int. Cl.².......................................... C07J 17/00
[58] Field of Search........ 260/397.1, 239.55, 239.57

[56] References Cited
UNITED STATES PATENTS
3,506,652   4/1970   Creger .......................... 260/239.57

*Primary Examiner*—Elbert L. Roberts
*Attorney, Agent, or Firm*—Hammond & Littell

[57] ABSTRACT

The present invention relates to a dienic derivative of the androstane series having the formula

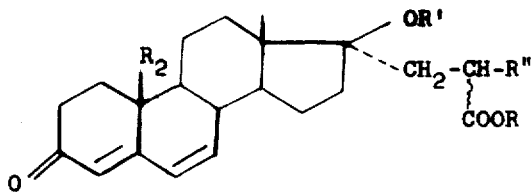

wherein R is a member selected from the group consisting of hydrogen, alkyl having 1 to 4 carbon atoms and alkali metal, R' and R" are members selected from the group consisting of 1) hydrogen and —COOM, respectively, where M is alkali metal, and 2) taken together, the divalent

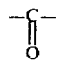

group, R₂ is a member selected from the group consisting of hydrogen and methyl, with the proviso when R is hydrogen or alkyl having 1 to 4 carbon atoms, R' and R" together are the divalent

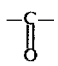

group; as well as their process of preparation.

20 Claims, No Drawings

DIENIC DERIVATIVES OF THE ANDROSTANE SERIES AND PROCESS

THE PRIOR ART

U.S. Pat. Nos. 3,300,489 and 3,475,420 describe closely related compounds which do not, however, have the 6—7 double bond.

OBJECTS OF THE INVENTION

An object of the present invention is the production of a dienic derivative of the androstane series having the formula

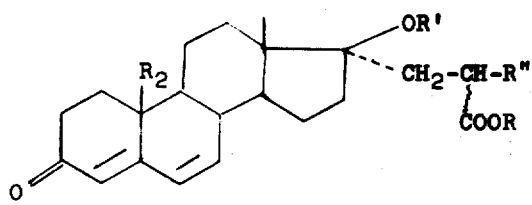

wherein R is a member selected from the group consisting of hydrogen, alkyl having 1 to 4 carbon atoms and alkali metal, R' and R" are members selected from the group consisting of (1) hydrogen and —COOM, respectively, where M is alkali metal, and (2) taken together, the divalent

group, $R_2$ is a member selected from the group consisting of hydrogen and methyl, with the proviso when R is hydrogen or alkyl having 1 to 4 carbon atoms, R' and R" together are the divalent

group.

Another object of the present invention is the development of a process for the production of the above dienic derivatives of the androstane series comprising the steps of reacting a compound having the formula

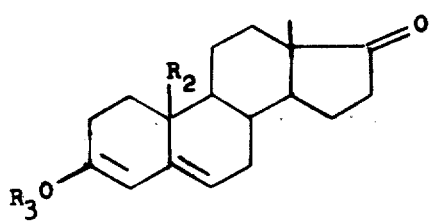

wherein $R_2$ is a member selected from the group consisting of hydrogen and methyl and $R_3$ is alkyl having 1 to 2 carbon atoms, with a trimethylsulfonium halide having the formula

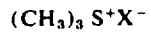

$$(CH_3)_3 S^+ X^-$$

wherein X is a halide selected from the group consisting of bromine and iodine, in the presence of a basic agent, dehydrogenating the resulting product having the formula

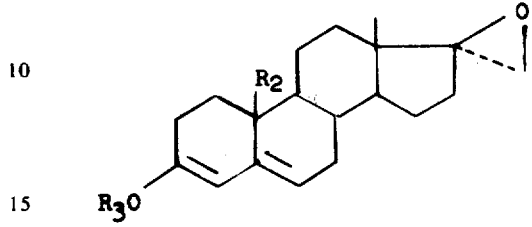

wherein $R_2$ and $R_3$ have the above-mentioned values, in the presence of a dehydrogenating agent, reacting the resulting product having the formula

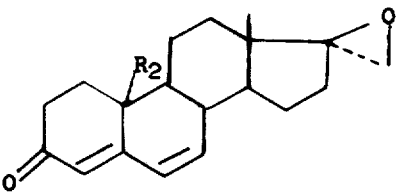

wherein $R_2$ has the above-mentioned values, with a dialkyl malonate having the formula

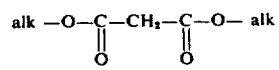

$$alk-O-C-CH_2-C-O-alk$$
$$\quad\quad \| \quad\quad\quad \|$$
$$\quad\quad O \quad\quad\quad O$$

wherein alk is an alkyl having from 1 to 4 carbon atoms, in the presence of a basic agent, and recovering said dienic derivative of the androstane series.

These and other objects of the invention will become more apparent as the description thereof proceeds.

DESCRIPTION OF THE INVENTION

The above objects were achieved by the development of a dienic derivative of the androstane series having the formula I

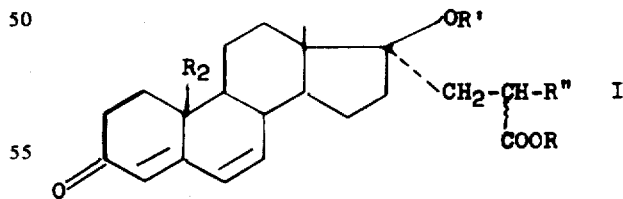

wherein R is a member selected from the group consisting of hydrogen, alkyl having 1 to 4 carbon atoms and alkali metal, R' and R" are members selected from the group consisting of (1) hydrogen and —COOM, respectively, where M is alkali metal, and (2) taken together, the divalent

group, $R_2$ is a member selected from the group consisting of hydrogen and methyl, with the proviso when R is hydrogen or alkyl having 1 to 4 carbon atoms, R' and R'' together are the divalent

group.

In the above formula, the alkyl radical R can be, for example, methyl, ethyl, propyl, isopropyl, butyl or tert.-butyl. The alkali metal R and M can be, for example, sodium or potassium.

In particular, the invention relates to the following products:

1. a product having the formula

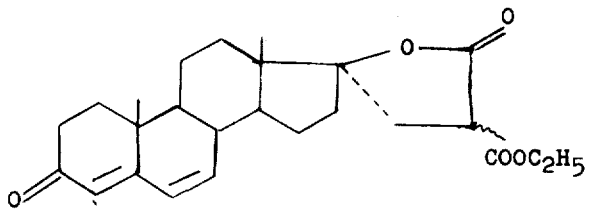

Compound I, where R' and R'' together are the divalent ketone group, R is ethyl and $R_2$ is methyl.

2. a product having the formula

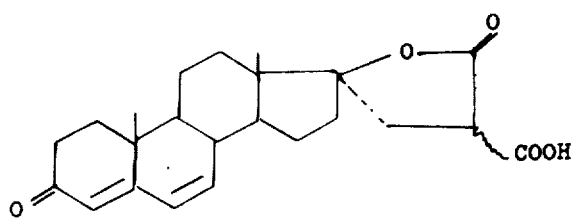

and its alkali metal salts, compound I, where R' and R'' together are the divalent ketone group, R is hydrogen (or alkali metal) and $R_2$ is methyl.

3. a product having the formula

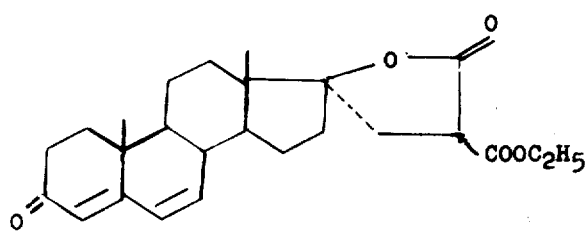

Compound I, where R' and R'' together are the divalent ketone group, R is ethyl and $R_2$ is hydrogen.

4. a product having the formula

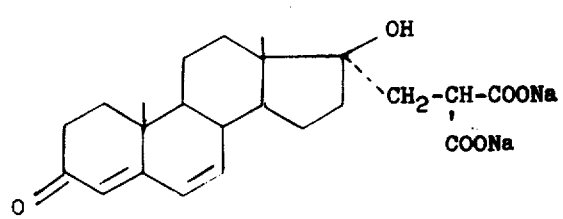

Compound I, where R' is hydrogen, R'' is —COONa, R is sodium and $R_2$ is methyl.

The invention also relates to a process for the preparation of these products and their use in the preparation of other known steroids.

According to this process, the products of formula I are obtained by the process comprising the steps of reacting a compound having the formula II

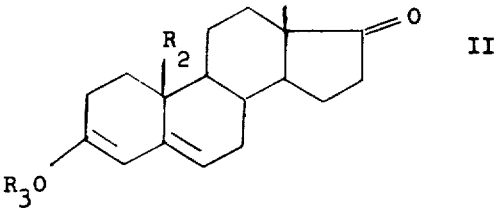

wherein $R_2$ is a member selected from the group consisting of hydrogen and methyl and $R_3$ is alkyl having 1 to 2 carbon atoms, with a trimethylsulfonium halide having the formula $(CH_3)_3 S^+X^-$ wherein X is a halide selected from the group consisting of bromine and iodine, in the presence of a basic agent, dehydrogenating the resulting product having the formula III

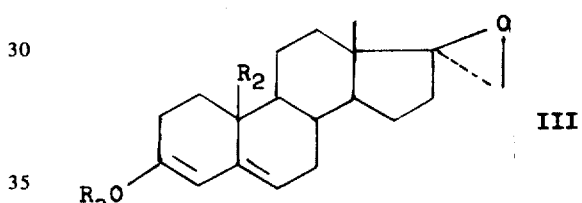

wherein $R_2$ and $R_3$ have the above-mentioned values, in the presence of a dehydrogenating agent, reacting the resulting product having the formula IV

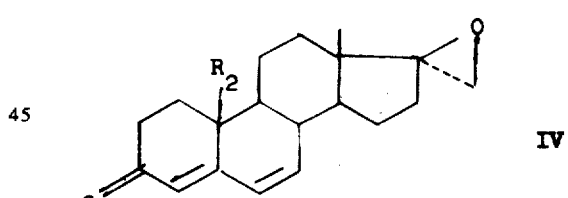

wherein $R_2$ has the above-mentioned values, with a dialkyl malonate having the formula V

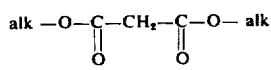

wherein alk is an alkyl having from 1 to 4 carbon atoms, in the presence of a basic agent to give a product having the formula VI

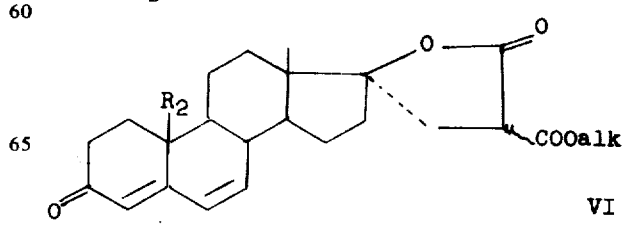

This corresponds to a product of formula I where R is alkyl and R' and R'' together are the divalent ketone group. The products of formula VI can be treated, if desired, by an alkaline hydrolysis followed by an acidification of the reaction mixture to give products of the formula VII

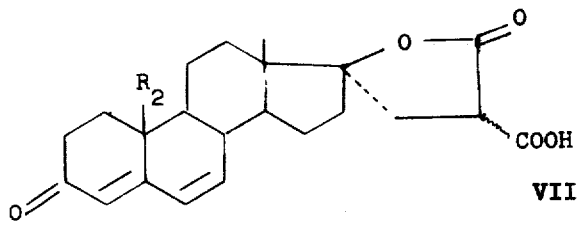

VII

This corresponds to a product of formula I where R is hydrogen and R' and R'' together are the divalent ketone group. The products of formula VII can either be neutralized by an equimolar amount of an alkali metal base to give the corresponding alkali metal salts, or be treated with an excess of an alkali metal base in order to obtain products of the formula VIII

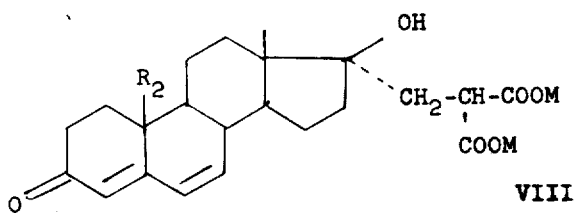

VIII

This corresponds to a product of formula I where R is an alkali metal, R' is hydrogen and R'' is an alkali metal carboxylate.

In the process, the basic agent employed in the reaction of trimethylsufonium halide with a product of Formula II, is preferably an alkaline alcoholate such as an alkali metal lower alkanolate, for example sodium ethylate, but an alkaline hydride can also be utilized such as an alkali metal hydride, for example sodium hydride. The dehydrogenating agent which is used to transform the products of Formula III into products of Formula IV is preferably tetrachloro-p-benzoquinone (chloranil), but other halogenated derivatives of p-benzoquinone can be employed, as for example 2,3-dichloro-5,6-dicyano-p-benzoquinone.

The basic agent employed in the reaction of the dialkyl malonate of Formula V with a product of Formula IV preferably is an alkaline alcoholate such as an alkali metal lower alkanolate, for example sodium ethylate. However, an alkaline amide or an alkaline hydride, such as an alkali metal amide or an alkali metal hydride, for example sodium amide or sodium hydride, can also be utilized in the reaction.

The alkaline hydrolysis which is made in order to transform the products of Formula VI into products of the Formula VII is effected preferably with the aid of an alkali metal hydroxide such as sodium hydroxide in an aqueous media. However, other alkaline reactants may be employed such as potassium hydroxide or alkali metal carbonates and bicarbonates, for example sodium bicarbonate, the hydrolysis being conducted either in an aqueous media or in a hydroalcoholic media such as water and a water-soluble lower alkanol, for example water and ethanol.

The alkaline bases employed in order to transform the products of the Formula VII into the corresponding alkaline salts or into products of the Formula VIII, are the alkali metal hydroxides such as sodium or potassium hydroxide.

The epoxides of the Formula III are in the 17β-configuration. The reaction employed for their preparation is stereospecific and gives this isomer exclusively.

The alkoxycarbonyl and hydroxycarbonyl (carboxy) functions attached to the lactone ring of the preceding various products of the invention are represented as being attached to the ring by a wavy line indicating that the two isomers, α and β, can be obtained and that the compounds obtained are in the form of the mixture of isomers.

The process of synthesis of the present invention presents an unexpected character at several points. Thus, the yield obtained in the course of the synthesis are very satisfactory inasmuch as these operations are conducted on steroid molecules of a complex structure. In addition, during the step of reacting the product of the Formula IV with the reaction product of a dialkyl malonate of Formula V with a basic agent (with a malonate anion); it can be noted in an unexpected fashion, that the said anion selectively attaches to the 17-position of the product of the Formula IV.

It would have been expected that, at the same time, this anion would condense on the conjugated 3-keto-$\Delta^{4,6}$ system, giving an addition in the 7-position and also on the epoxide in the 17-position in order to form the lactone. The literature, in fact, gives numerous examples in which a malonate anion, or an anion derived from a methylic carbanion, condenses on ketodienic systems comparable in all points to that of the products of Formula IV (see, among others, Yanagita, J. Org. Chem. 1958, 23, 690; Ralls, J. Am. Chem. Soc. 1953, 75, 2123; Campbell et al, J. Am. Chem. Soc. 1959, 81, 4069; and Campbell et al, Steroids, 1963, 1, 317). In the present instance, however, the condensation takes place solely on the epoxide in the 17-position, without any indication of any addition in the 7-position.

within the area of the process according to the invention there remains particularly a process for the production of spiro-[(4,6-androstadien-3-one)-17β,2'-(4'-ethoxycarbonyl-1'-oxa-cyclopent-5'-one)] which comprises the steps of reacting 3-ethoxy-3,5-androstadien-17-one with trimethylsulfonium bromide in the presence of a basic agent, dehydrogenating the resulting 3-ethoxy-spiro-17β-oxiranyl-3,5-androstadiene with a dehydrogenating agent, reacting the resulting spiro-17β-oxiranyl-4,6-androstadien-3-one with diethyl malonate in the presence of a basic agent, and recovering the resulting spiro-[(4,6-androstadien-3-one)-17β,2'-(4'-ethoxycarbonyl-1'-oxa-cyclopentan-5'-one)].

Under the preferable conditions of operating this process, the basic agent utilized with the trimethylsulfonium bromide is sodium hydride, the dehydrogenating agent is tetrachloro-p-benzoquinone and the basic agent utilized with the diethyl malonate is sodium ethylate.

Equally within the scope of the invention, products of the Formula I, in which R is alkyl, R'' together with R' is a divalent

group and $R_2$ is methyl, that is products of the above formula VI in which $R_2$ is methyl, can be prepared by a process comprising the steps of reacting a product having the Formula III'

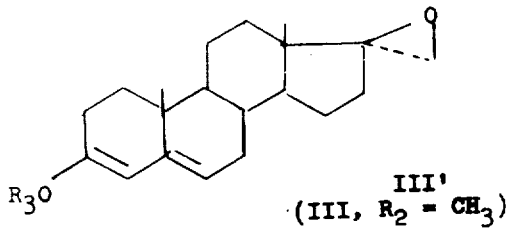

(III, $R_2 = CH_3$)

wherein $R_3$ is alkyl having 1 to 2 carbon atoms, with a dialkyl malonate having the formula V

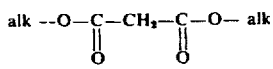 V wherein alk is an alkyl having from 1 to 4 carbon atoms, in the presence of a basic agent, dehydrogenating the resulting product having the Formula IX

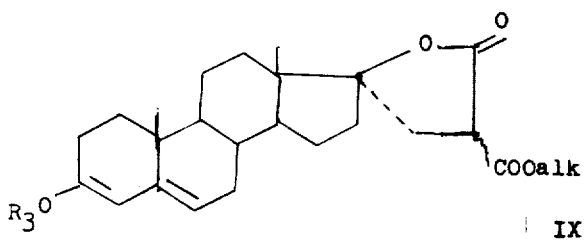

IX wherein $R_3$ and alk have the above-assigned values, in the presence of a dehydrogenating agent, and recovering said product of Formula VI, where $R_2$ is methyl (or the product of Formula I where R is alkyl having 1 to 4 carbon atoms, R' and R'' together are the divalent

group, and $R_2$ is methyl).

The basic agent employed in the reaction of the dialkyl malonate of Formula V with the products of Formula III, where $R_2$ is methyl, is preferably an alkaline alcoholate such as an alkali metal lower alkanolate, for example sodium ethylate. However, an alkaline amide or hydride, such as an alkali metal amide or hydride, for example sodium amide or hydride, can also be employed.

The dehydrogenating agent utilized to transform the products of Formula IX into products of Formula VI where $R_2$ is methyl, preferably is tetrachloro-p-benzoquinone (chloranil), but other halogenated derivatives of p-benzoquinone can be employed, such as, for example, 2,3-dichloro-5,6-dicyano-p-benzoquinone.

In addition, the invention also relates to the application of products of the formula I'

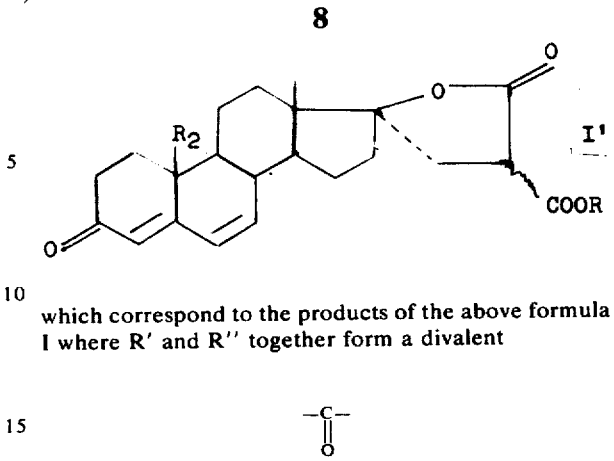

which correspond to the products of the above formula I where R' and R'' together form a divalent

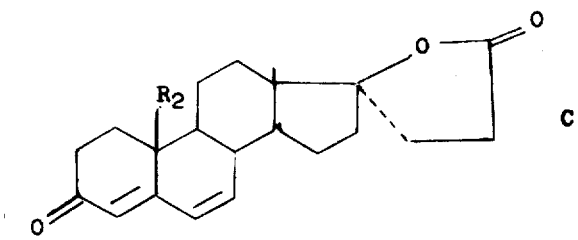

group and R is alkyl having 1 to 4 carbon atoms, to the preparation of steroidal spirolactones of the formula C

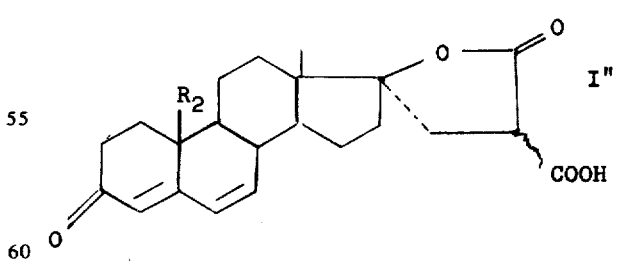

wherein $R_2$ is hydrogen or methyl. This process is characterized in that the products of formula I' are transformed into the products of formula C by heating in the presence of water.

Preferably, the heating is conducted at a temperature above 80°C and most advantageously between 100°C and 160°C. As the presence of water is necessary, it is convenient, in view of the preferred temperature, to conduct the reaction in a closed vessel, thus under a slight pressure.

The transformation of the products of the formula I' into products of the formula C by heating in a neutral media is unexpected. The probable mechanism for such a reaction is indicated, for analogous products, in the specification of our copending U.S. Pat. application Ser. No. 438,601 filed concurrently herewith.

The products of formula C are of therapeutic interest as will be explained later.

Furthermore, the products of formula I''

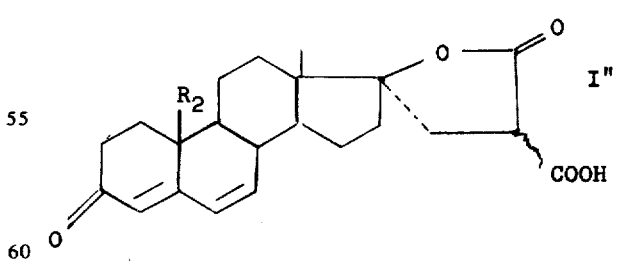

which corresponds to products of the above formula I where R' and R'' together form a divalent

group and R is hydrogen, can be utilized to produce the above products of formula C. The process is characterized in that the products of formula I'' are transformed into the products of Formula C by heating. Preferably, the heating is at a temperature of over 80°C and most advantageously between 100°C and 220°C.

The products of the formula I, an object of the invention, are also useful in the preparation of interesting derivatives in the therapeutic field, other than those derivatives of the formula C.

This utility is described in our copending U.S. Pat. application Ser. No. 438,601, filed concurrently herewith and discloses a process of treating products of the formula I with a thioalkanoic acid of the formula

R₁ COSH wherein $R_1$ is a linear alkyl having 1 to 4 carbon atoms, to give products of the formula B

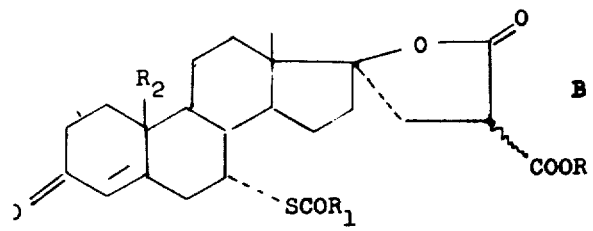

wherein R is hydrogen or an alkyl having 1 to 4 carbon atoms and $R_1$ and $R_2$ have the above meanings, which is transformed by heating, if R is hydrogen, and by heating in a neutral media and in the presence of water, if R is alkyl, into steroidal spirolactones of the formula A

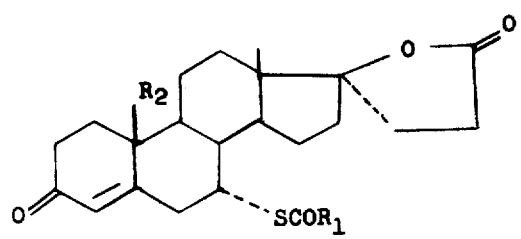

wherein $R_1$ is a linear alkyl having from 1 to 4 carbon atoms and $R_2$ is a member selected from the group consisting of hydrogen and methyl.

The product of the formula A, in which $R_1$ and $R_2$ are methyl, and the product of the formula C, in which $R_2$ is methyl, are respectively spironolactone and canrenone. They are interesting products in the therapeutic field. They oppose the action of aldosterone (see Burger, 1970, Medicinal Chemistry, 3rd Ed. p 1001 to 1003) and can thus be used for their diuretic action. They are utilized in particular in the treatment of certain cardiac disturbances.

The remaining members of the products of formulas A and C likewise have a comparable usage.

The invention also relates to intermediate products useful in the preparation of the products of formula I, which are oxiranyl products having the formula

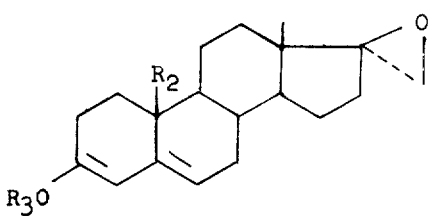

wherein $R_2$ is a member selected from the group consisting of hydrogen and methyl and $R_3$ is alkyl having 1 to 2 carbon atoms.

The following examples are illustrative of the invention. It is to be understood, however, that they are not limitative in any manner.

EXAMPLE 1

Spiro-[(4,6-androstadien-3-one)-17β,2'-(4'-ethoxycarbonyl-1'-oxa-cyclopentan-5'-one)]

Step A 3-ethoxy-spiro-17β-oxiranyl-3,5-androstadiene:

45.2 gm of sodium hydride were placed in suspension in 1500 cc of dimethylsulfoxide. The suspension was heated to 60°C for 2 hours and then allowed to stand overnight at room temperature. Then, 1200 cc of tetrahydrofuran were added to the black solution obtained. The material was cooled to −5°C and 384 gm of trimethylsulfonium iodide in suspension in 1350 cc of dimethylsulfoxide was added. The preceding mixture was then cooled to −5°C and 150 gm of 3-ethoxy-3,5-androstadien-17-one (prepared starting from 4-androsten-3,17-dione according to Serini et al, Ber. 1938, 71, 1766) dissolved in 1200 cc of tetrahydrofuran was introduced. The reaction mixture was then allowed to return to room temperature and agitated for seventeen hours. The reaction mixture was then poured into 15 liters of iced water and agitated for 1 hour. The precipitate formed was vacuum filtered, washed with water and dried. The product was purified by recrystallization from acetone, which gave 139.7 gm of 3-ethoxy-spiro-17β-oxiranyl-3,5-androstadiene in the form of colorless crystals.

Melting Point: 105°C
$[\alpha]_D^{20} = -161°$ (c=1% in ethanol containing 1% pyridine)

Analysis: $C_{22}H_{32}O_2$
Calculated 80.44% C; 9.82% H
Found 80.5%; 10.0%

Step B  Spiro-17β-oxiranyl-4,6-androstadien-3-one.

50 gm of the product obtained in the preceding step was placed in suspension in 750 cc of acetone containing 5% of water. 37.5 gm of tetrachloro-p-benzoquinone were added to this suspension in the absence of light and the mixture was agitated for 3 hours at room temperature.

The reaction mixture was poured into 2.5 L of water containing 100 cm3 of 36° Be sodium hydroxide and stirred for one hour. The precipitate formed was vacuum filtered, washed with water and dried.

The product was dissolved in methylene chloride and purified by filtration through alumina. After evaporation of the solvent and trituration of the residue with acetone, 39 gm of spiro-17β-oxiranyl-4,6-androstadien-3-one were obtained in the form of colorless crystals.

Melting Point: 240°C
[α] $_D^{20}$ = +39° ($c$ = 0.5% in chloroform)
Analysis: $C_{20}H_{28}O_2$
Calculated: 80.50% C; 8.78% H
Found: 80.2 %; 9.0 %

Step C
Spiro-[(3-ethoxy-3,5-androstadiene)-17β,2'-(4'-ethoxycarbonyl-1'-oxa-cyclopentan-5'-one)]

An ethanolic solution of sodium ethylate was prepared starting from 3.15 gm of sodium and 150 cc of ethanol. 45.8 gm of diethyl malonate and 30 gm of the product prepared from Step A were added to this solution. The mixture was heated to reflux for 5 hours, then cooled to room temperature. The reaction mixture was poured into a saturated aqueous solution of ammonium chloride and agitated for one hour. The precipitate formed was vacuum filtered, washed with water and dried.

The product was purified by recrystallization from absolute ethanol, giving 31.6 gm of spiro-[(3-ethoxy-3,5-androstadiene)-17β,2'-(4'-ethoxycarbonyl-1'-oxa-cyclopentan-5'-one)] in the form of colorless crystals.
Melting Point: 131°C
Analysis: $C_{27}H_{38}O_5$
Calculated: 73.27% C; 8.65% H
Found: 73.0 %; 8.8 %

Step D
Spiro-[(4,6-androstadien-3-one)-17β,2'-(4'-ethoxycarbonyl-1'-oxa-cyclopentan-5'-one)]

An ethanolic solution of sodium ethylate was prepared starting from 5.39 gm of sodium and 350 cc of absolute ethanol. 46.9 gm of diethyl malonate and 35 gm of the product prepared from Step B was added to this solution. The mixture was heated to reflux for 3 hours and then cooled to room temperature. The reaction mixture was then poured into a solution of 175 gm of ammonium chloride in 875 cc of iced water and agitated for one hour. The precipitate formed was vacuum filtered, washed with water and dried.

The product was purified by recrystallization from absolute ethanol, giving 41.3 gm of spiro-[(4,6-androstadien-3-one)-17β,2'-(4'-ethoxycarbonyl-1'-oxa-cyclopentan-5'-one)] in the form of colorless crystals.

The NMR spectra shows that the product is constituted by a mixture of almost equal parts of each of the isomers at the point of the ethoxycarbonyl substituent.
Melting Point: 149°C
[α] $_D^{20}$ = −25° ($c$=0.5% in chloroform)
U.V. Spectra — Ethanol λ max. at 284 nm    ε = 26,000

Analysis: $C_{25}H_{32}O_5$
Calculated: 72.78% C; 7.81% H
Found: 72.7 %; 7.7 %

Step D'
Spiro-[(4,6-androstadien-3-one)-17β,2'-(4'-ethoxycarbonyl-1'-oxa-cyclopentan-5'-one)]

30 gm of the product prepared in Step C was placed in suspension in 300 cc of acetone containing 5% of water. 18.2 gm of tetrachloro-p-benzoquinone was added to this suspension and the mixture was agitated for 2 hours at room temperature in the absence of light. The reaction mixture was then poured into 1500 cc of water and extracted with methylene chloride. After drying and evaporation of the extraction solvent, the residue was taken up by 280 cc of methylene chloride. The insolubles were filtered and the filtrate was treated witth alumina. After elimination of the alumina and evaporation of the solvent, the residue was recrystallized from ethanol. 15.1 gm of spiro-[(4,6-androstadien-3-one)-17β,2'-(4'-ethoxycarbonyl-1'-oxa-cyclopentan-5'-one)] were obtained in the form of colorless crystals.
Melting Point: 149°C
U.V. Spectra — Ethanol λ Max. at 284 nm    ε = 26,000

The product is identical to that described in Step D.

EXAMPLE 2

Spiro-[(4,6-androstadien-3-one)-17β,2'-(4'-carboxy-1'-oxa-cyclopentan-5'-one)]

40 gm of the product of Step D in Example 1 were introduced into 200 cc of water containing 200 cc of an aqueous solution of 2N sodium hydroxide. The mixture obtained was agitated for 15 hours at room temperature, giving an orange colored solution. This solution was cooled to 5°C and treated with 70 cc of an aqueous solution of 6N hydrochloric acid. The precipitate obtained was vacuum filtered after 1 hour of agitation, washed with water and dried.

The product was purified by dissolution in normal aqueous sodium hydroxide and recrystallization by concentrated hydrochloric acid. 35.4 gm of spiro-[(4,6-androstadien-3-one)-17β,2'-(4'-carboxy-1'-oxa-cyclopentan-5'-one)] was obtained in the form of colorless crystals.
Melting Point: Decomposition starting from 130°C
[α] $_D^{20}$ = −35° ($c$ = 1% in chloroform)
U.V. Spectra— Ethanol λ Max. at 283 nm    ε = 25,850

Analysis: $C_{23}H_{28}O_5$
Calculated: 71.85% C; 7.34% H
Found: 71.6 %; 7.5 %

EXAMPLE 3

Spiro-[(4,6-estradien-3-one)-17β,2'-(4'-ethoxycarbonyl-1'-oxa-cyclopentan-5'-one)]

Step A    3-ethoxy-spiro-17β-oxiranyl-3,5-estradiene 14.3 gm of sodium methylate were placed in suspension in 125 cc of dimethylsulfoxide. The suspension was heated to 60°C for 2 hours, then brought to 7°C. 50 cc of tetrahydrofuran, 26 gm of trimethylsulfonium bromide and 25 gm of 3-ethoxy-3,5-estradien-17-one (prepared according to Djerassi, J. Am. Chem. Soc. 1953, 75, 4117) dissolved in 150 cc of tetrahydrofuran were added to the cooled suspension. The temperature of the mixture was brought to 20°C and the mixture was agitated at this temperature for 2 hours. 1 liter of iced water was then added thereto, then the precipitate formed was vacuum filtered and washed with water. The product was recrystallized from ethanol, giving 22.7 gm of 3-ethoxy-spiro-17β-oxiranyl-3,5-estradiene in the form of colorless crystals.
Melting Point: 160°C
[α] $_D^{20}$ = −177° ($c$ = 1% in pyridine)
Analysis: $C_{21}H_{30}O_2$
Calculated: 80.21% C; 9.62% H
Found: 79.9 %; 9.7 %

Step B    Spiro-17β-oxiranyl-4,6-estradien-3-one

While operating as in Step B of Example 1, but while utilizing 20 gm of 3-ethoxy-spiro-17β-oxiranyl-3,5-estradiene, 12.3 gm of spiro-17β-oxiranyl-4,6-estradien-3-one were obtained after recrystallization from acetone, in the form of colorless crystals.
Melting Point: 184°C
$[\alpha]_D^{20} = -32.6°$ ($c = 0.5\%$ in chloroform)
Analysis: $C_{19}H_{24}O_2$
Calculated: 80.24% C; 8.51% H
Found: 80.5 %; 8.7 %

Step C

Spiro-[(4,6-estradien-3-one)-17β,2'-(4'-ethoxycarbonyl-1'-oxa-cyclopentan-5'-one)]

While operating as in Step D of Example 1, but while utilizing 11 gm of spiro-17β-oxiranyl-4,6-estradiene-3-one, 9 gm of spiro-[(4,6-estradien-3-one)-17β,2'-(4'-ethoxycarbonyl-1'-oxa-cyclopentan-5'-one)] were obtained after recrystallization from ethanol, in the form of colorless crystals.

The NMR spectra showed that the product is in the form of a mixture of isomers at the point of the ethoxycarbonyl substituent.

Two supplementary recrystallizations from ethanol gave a single product.
Melting Point: 185°C – 186°C
$[\alpha]_D^{20} = -103°$ ($c = 0.5\%$ in chloroform)
Analysis: $C_{24}H_{30}O_5$
Calculated: 72.34% C; 7.59% H
Found: 72.2 %; 7.3 %

EXAMPLE 4

The disodium salt of
2'-carboxy-3'-(17β-hydroxy-3-oxo-4,6-androstadien-17-yl)-propionic acid.

5 gm of spiro-[(4,6-androstadien-3-one)-17β,2'-(4'-carboxy-1'-oxa-cyclopentan-5'-one)] were placed in suspension in 30 cc of water. 1.09 gm of sodium bicarbonate were added and the mixture was agitated for 3½ at room temperature. The solution obtained was cooled to 0°C and 12.7 cc of aqueous N sodium hydroxide was added dropwise. The mixture was agitated for 1½ hours at 0°C, then for 24 hours at room temperature. The water was then evaporated under vacuum at a low temperature and a white solid was obtained. This was recrystallized by solution in water and precipitation by acetone. 4.28 gm of the disodium salt of 2'-carboxy-3'-(17β-hydroxy-3-oxo-4,6-androstadien-17-yl)-propionic acid were thus obtained in the form of cream colored crystals.
Melting Point: Higher than 250°C
U.V. Spectra- Ethanol - 0.1N HCl $\lambda$ Max. at 284 nm $\epsilon = 25,600$ Analysis: $C_{23}H_{28}Na_2O_6$
Calculated: 61.87% C; 6.32% H; 10.3% Na
Found: 61.9 %; 6.0 %; 10.4%

EXAMPLE 5

γ-lactone of
17β-hydroxy-4,6-pregnadien-3-one-21-carboxylic acid 3 gm of spiro-[(4,6-androstadien-3-one)-17β,2'-(4'-carboxy-1'-oxa-cyclopentan-5'-one)] and 60 cc of toluene were introduced into an autoclave. The autoclave was closed and maintained at 125°C under agitation for 17 hours, the pressure stabilizing at 2.5 kg/cm². The reaction media was then evaporated under vacuum and the residue was dissolved in chloroform. The chloroformic solution was washed with a saturated aqueous solution of sodium bicarbonate and dried over magnesium sulfate. After evaporation of the chloroform, the residue was taken up in boiling isopropyl ether. A crystallized product was obtained which was vacuum filtered, giving 2 gm of the γ-lactone of 17β-hydroxy-4,6-pregnadien-3-one-21-carboxylic acid in the form of colorless crystals.
Melting Point: 163°C
$[\alpha]_D^{20} = +21°$ ($c = 1\%$ in chloroform)

EXAMPLE 6

γ-lactone of
17β-hydroxy-4,6-pregnadien-3-one-21-carboxylic acid.

3 gm of spiro-[(4,6-androstadien-3-one)-17β,2'-(4'-ethoxycarbonyl-1'-oxa-cyclopentan-5'-one)], 57 cc of toluene and 3 cc of water were introduced into an autoclave. The autoclave was closed and heated under agitation to 120°C – 125°C, the pressure stabilizing at 3 kg/cm². The heating and agitation were continued for 15 hours. Then the reaction media was evaporated under vacuum and a residue was obtained which crystallized on addition of isopropyl ether. The crystals obtained were washed with boiling isopropyl ether, then vacuum filtered. 2.45 gm of the γ-lactone of 17β-hydroxy-4,6-pregnadien-3-one-21-carboxylic acid was thus obtained in the form of colorless crystals.
Melting Point: 163°C
$[\alpha]_D^{20} = +21°$ ($c = 1\%$ in chloroform)
The product is identical to that obtained in Example 5.

EXAMPLE 7

γ-lactone of
19-nor-17β-hydroxy-4,6-pregnadien-3-one-21-carboxylic acid 1 gm of the product prepared in Step C of Example 3, 8 cc of toluene and 2 cc of water was introduced into an autoclave. The autoclave was closed and heated under agitation to 140°C, the pressure stabilizing at 3 kg/cm². The heating and agitation were continued for 15 hours. The reaction media was evaporated under vacuum and a residue was obtained which was taken up in refluxing ethanol. After cooling, the crystals obtained were vacuum filtered and washed with iced ethanol. 0.6 gm of the γ-lactone of 19-nor-17β-hydroxy-4,6-pregnadien-3-one-21-carboxylic acid were obtained in the form of colorless crystals.
Melting Point: 244°C – 245°C
$[\alpha]_D^{20} = -47°$ ($c=1\%$ in chloroform)

The preceding examples are illustrative of the practice of the invention. It is to be understood, however, that other expedients known to those skilled in the art or disclosed herein may be employed without departing from the spirit of the invention or the scope of the appended claims.

We claim:

1. A dienic derivative of the androstane series having the formula

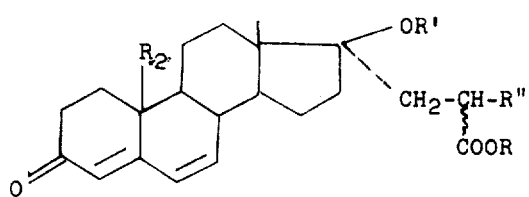

wherein R is a member selected from the group consisting of hydrogen, alkyl having 1 to 4 carbon atoms and alkali metal, R' and R'' are members selected from the group consisting of (1) hydrogen and —COOM, respectively, where M is alkali metal, and (2) taken together, the divalent

group, $R_2$ is a member selected from the group consisting of hydrogen and methyl, with the proviso when R is hydrogen or alkyl having 1 to 4 carbon atoms, R' and R'' together are the divalent

group.

2. The dienic derivative of the androstane series of claim 1 wherein R is ethyl, R' and R'' together are the divalent

group and $R_2$ is methyl.

3. The dienic derivative of the androstane series of claim 1 wherein R is hydrogen, R' and R'' together are the divalent

group and $R_2$ is methyl, and its alkali metal salts.

4. The dienic derivative of the androstane series of claim 1 wherein R is ethyl, R' and R'' together are the divalent

group and $R_2$ is hydrogen.

5. The dienic derivative of the androstane series of claim 1 wherein R is sodium, R' is hydrogen, R'' is —COONa and $R_2$ is methyl.

6. A process for the preparation of a dienic derivative of the androstane series of claim 1 comprising the steps of subjecting a compound having the formula

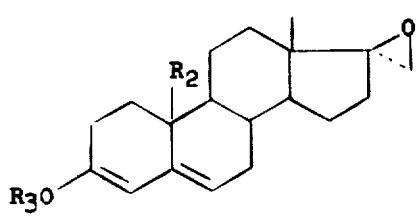

wherein $R_2$ is a member selected from the group consisting of hydrogen and methyl and $R_3$ is alkyl having 1 to 2 carbon atoms to dehydrogenation, in the presence of a halogenated derivative of p-benzoquinone dehydrogenating agent, reacting the resulting product having the formula

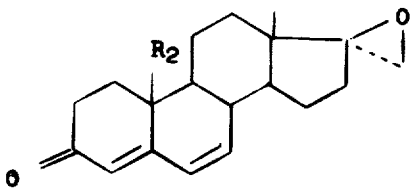

wherein $R_2$ has the above-mentioned values, with a dialkyl malonate having the formula

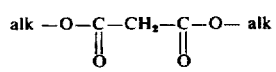

wherein alk is an alkyl having from 1 to 4 carbon atoms, in the presence of a basic agent selected from the group consisting of alkali metal lower alkanolate, alkali metal amide and alkali metal hydride, and recovering said dienic derivative of the androstane series.

7. The process of claim 6 wherein said recovery step are the steps comprising subjecting the compound obtained from the reaction with said dialkyl malonate and having the formula

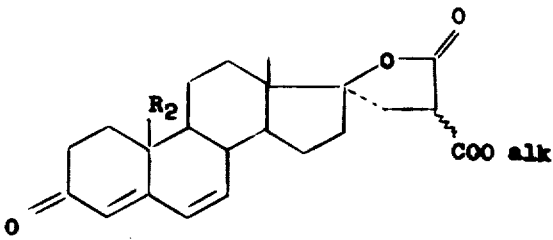

wherein $R_2$ and alk have the values assigned to claim 6, to an aqueous alkaline hydrolysis in the presence of an alkaline hydrolysis agent followed by acidification, whereby a dienic derivative of the androstane series is recovered with R is hydrogen.

8. The process of claim 6 wherein said recovery step are the steps comprising subjecting the compound obtained from the reaction with said dialkyl malonate having the formula

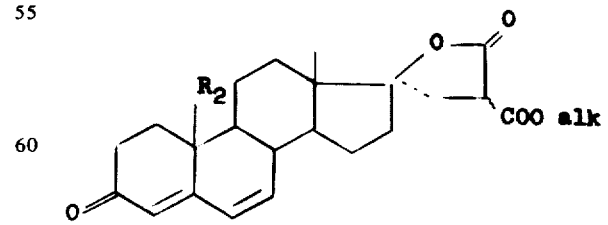

wherein $R_2$ and alk have the values assigned to claim 6, to an aqueous alkaline hydrolysis in the presence of an alkaline hydrolysis agent followed by acidification, and treating the resulting acidic compound with an equimolar amount of an alkali metal base, whereby a dienic derivative of the androstane series is recovered where R is alkali metal.

9. The process of claim 6 wherein said recovery step are the steps comprising subjecting the compound obtained from the reaction with said dialkyl malonate and having the formula

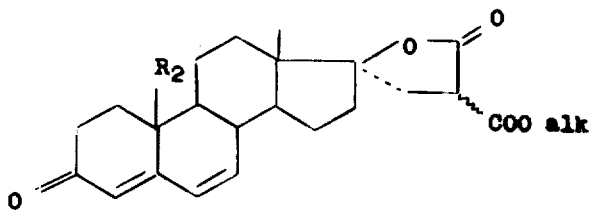

wherein $R_2$ and alk have the values assigned to claim 6, to an aqueous alkaline hydrolysis in the presence of an alkaline hydrolysis agent followed by acidification, and treating the resulting acidic compound with an excess of an alkali metal base, whereby a dienic derivative is recovered where R' is hydrogen, R'' is —COO alkali metal and R is an alkali metal.

10. The process of preparing a dienic derivative of the androstane series of claim 1, where $R_2$ is methyl, comprising the steps of reacting a product having the formula

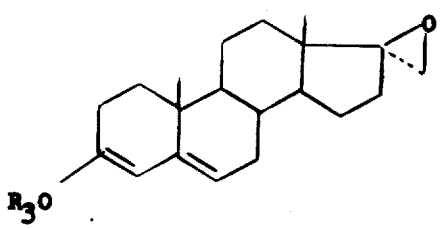

wherein $R_3$ is alkyl having 1 to 2 carbon atoms, with a dialkyl malonate having the formula

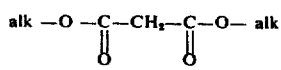

wherein alk is an alkyl having from 1 to 4 carbon atoms, in the presence of a basic agent selected from the group consisting of alkali metal lower alkanolate, alkali metal amide and alkali metal hydride, subjecting the resulting product having the formula

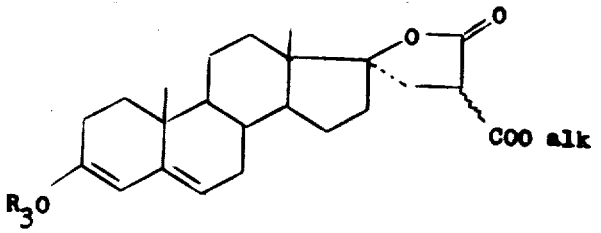

wherein $R_3$ and alk have the above-assigned values, to dehydrogenation in the presence of a halogenated derivative of p-benzoquinone dehydrogenating agent, and recovering said dienic derivative of the androstane series of claim 1, wherein $R_2$ is methyl, R' and R'' together are the divalent

group and R is alkyl having 1 to 4 carbon atoms.

11. Oxiranyl products having the formula

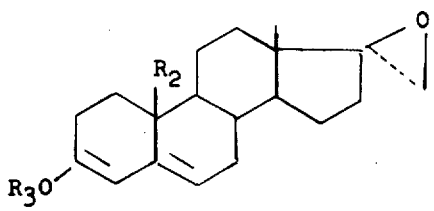

wherein $R_2$ is a member selected from the group consisting of hydrogen and methyl, and $R_3$ is alkyl having 1 to 2 carbon atoms.

12. The process for the production of a dienic compound of the androstane series of claim 1 comprising the steps of reacting a product having the formula

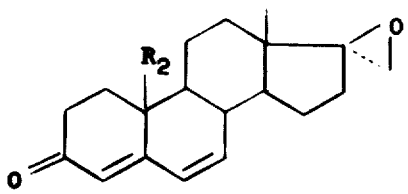

wherein $R_2$ is a member selected from the group consisting of hydrogen and methyl, with a dialkyl malonate having the formula

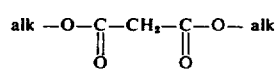

wherein alk is an alkyl having 1 to 4 carbon atoms, in the presence of a basic agent selected from the group consisting of alkali metal lower alkanolate, alkali metal amide and alkali metal hydride, and recovering said dienic derivatives of the androstane series.

13. The process of claim 12 wherein said basic agent is sodium ethylate.

14. The process of claim 12 wherein said recovery step are the steps comprising subjecting the compound obtained from the reaction with said dialkyl malonate and having the formula

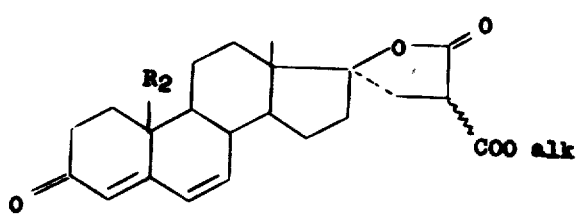

wherein $R_2$ and alk have the values assigned to claim 12, to an aqueous alkaline hydrolysis in the presence of an alkaline hydrolysis agent followed by acidification, whereby a dienic derivative of the androstane series is recovered where R is hydrogen.

15. The process of claim 12 wherein said recovery step are the steps comprising subjecting the compound obtained from the reaction with said dialkyl malonate and having the formula

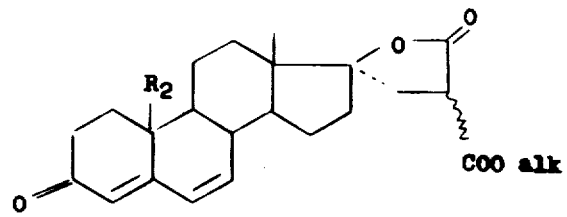

wherein $R_2$ and alk have the values assigned in claim 12, to an aqueous alkaline hydrolysis in the presence of an alkaline hydrolysis agent followed by acidification, and treating the resulting acidic compound with an equimolar amount of an alkali metal base, whereby a dienic derivative of the androstane series is recovered where R is alkali metal.

16. The process of claim 12 wherein said recovery step are the steps comprising subjecting the compound obtained from the reaction with said dialkyl malonate and having the formula

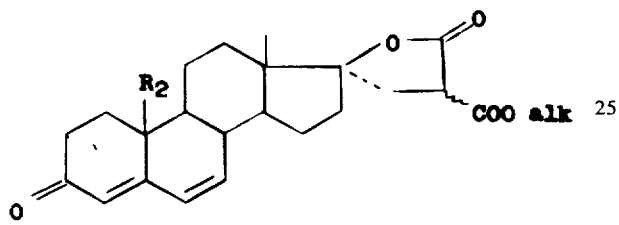

wherein $R_2$ and alk have the values assigned in claim 12, to an aqueous alkaline hydrolysis in the presence of an alkaline hydrolysis agent followed by acidification, and treating the resulting acidic compound with an excess of an alkali metal base, whereby a dienic derivative is recovered where R' is hydrogen, R" is —COO alkali metal and R is an alkali metal.

17. The process of claim 12 where R = alk = ethyl, R' and R" together are the divalent

group, $R_2$ is methyl.

18. A process for the production of a steroidal spirolactone having the formula

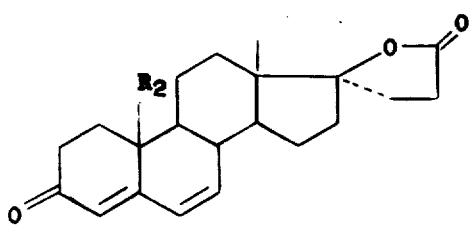

wherein $R_2$ is a member selected from the group consisting of hydrogen and methyl, comprising the steps of heating a dienic compound of the androstane series of claim 1, where R' and R" together are the divalent

group and R is alkyl having 1 to 4 carbon atoms, to a temperature between 80°C and 160°C in the presence of water, and recovering said steroidal spirolactone.

19. A process for the production of a steroidal spirolactone having the formula

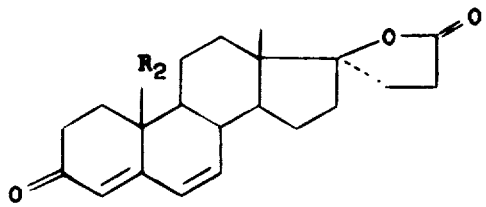

wherein $R_2$ is a member selected from the group consisting of hydrogen and methyl, comprising the steps of subjecting a dienic compound of the androstane series of claim 1, where R' and R" together are the divalent

group and R is alkyl having 1 to 4 carbon atoms, to an aqueous alkaline hydrolysis in the presence of an alkaline hydrolysis agent followed by acidification, heating the resulting acidic compound of the formula

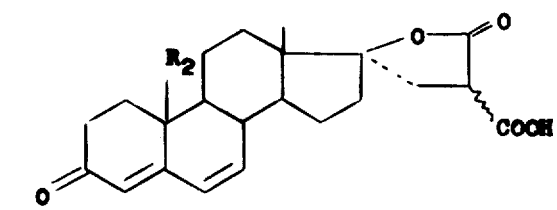

wherein $R_2$ has the above-assigned values, to a temperature between 80°C and 220°C, and recovering said steroidal spirolactone.

20. A process for the production of spiro-[(4,6-androstadien-3-one)-17β,2'-(4'-ethoxycarbonyl-1'-oxa-cyclopent-5'-one)] which comprises the steps of reacting 3-ethoxy-3,5-androstadien-17-one with trimethylsulfonium bromide in the presence of a basic agent, subjecting the resulting 3-ethoxy-spiro-17β-oxiranyl-3,5-androstadiene to dehydrogenation in the presence of a halogenated derivative of p-benzoquinone dehydrogenating agent, reacting the resulting spiro-17β-oxiranyl-4,6-androstadien-3-one with diethyl malonate in the presence of a basic agent selected from the group consisting of alkali metal lower alkanolate, alkali metal amide and alkali metal hydride, and recovering the resulting spiro-[(4,6-androstadien-3-one)-17β,2'-(4'-ethoxycarbonyl-1'-oxa-cyclopentan-5'-one)].

* * * * *